United States Patent Office 3,374,243
Patented Mar. 19, 1968

3,374,243
B-NORSTEROIDAL PYRAZOLES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed Jan. 26, 1965, Ser. No. 428,190
8 Claims. (Cl. 260—310)

ABSTRACT OF THE DISCLOSURE

17$\beta$-hydroxy-B-norandrosteno and estreno[3,2-c]-pyrazoles, optionally substituted at the 17$\alpha$-position with a methyl, ethyl, ethynyl, or methoxymethyl group, are prepared by condensation of the corresponding 2-hydroxymethylene-3-keto-$\Delta^4$-B-norsteroid with hydrazine hydrate. The products possess antiandrogenic and cholesterol-lowering activities.

This invention relates to B-norsteroidal pyrazoles having antihormonal properties.

The compounds of the invention are represented by the following formula:

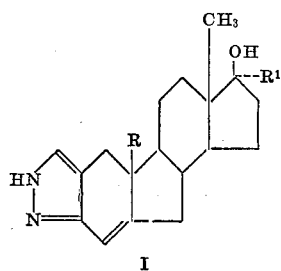

I wherein:

R is hydrogen or methyl; and
R$^1$ is hydrogen, methyl, ethyl, ethynyl, or methoxymethyl.

The compounds of the invention possess antihormonal activity, particularly antiandrogenic activity. The preferred compound of the invention is 17$\beta$-hydroxy-17$\alpha$-methyl-B-norandrost-4-eno[3,2-c]pyrazole, which possesses antiandrogenic activity. This compound also lowers plasma cholesterol levels.

A preferred group of compounds is represented by the following formula:

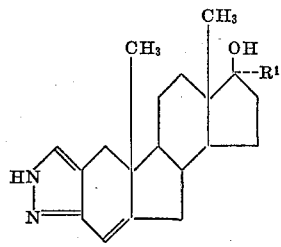

where R$^1$ is hydrogen, methyl, ethyl, ethynyl, or methoxymethyl.

The B-norsteroidal pyrazole compounds of the invention are prepared by condensing a 2-hydroxymethylene-3-keto-$\Delta^4$-B-norsteroid with 85% hydrazine hydrate. The two reactants are generally refluxed in a solvent such as methanol or ethanol for a period of one to five hours. The hydrazine hydrate is employed in excess. The product is isolated by evaporation of the solvent or by cooling and then filtering off the resulting crystalline product.

The 2-hydroxymethylene B-norsteroid starting materials are prepared by treating a 2-unsubstituted 3-keto-$\Delta^4$-B-norsteroid with a lower alkyl formate in the presence of a strong base such as sodium hydride. The reaction is most conveniently carried out in a solvent such as benzene or toluene, and at room temperature. These 2-hydroxymethylene starting materials are disclosed in our application Ser. No. 369,320, filed May 21, 1964, now U.S. Patent 3,331,868, or are readily prepared by methods described therein. The 2-unsubstituted compounds used for the preparation of the 2-hydroxymethylene compounds are described in our application Ser. No. 358,417, filed Apr. 8, 1964, now abandoned; or in the literature, J. Joska et al., Chem. and Ind., 1958, 1665–6, or J. F. Kerwin, U.S. 3,072,681.

The 17$\alpha$-methoxymethyl-B-nortestosterone starting material is formed by treating B-nordehydroepiandrosterone [J. Joska, Coll. Czech. Chem. Comm. 25, 1086 (1960)] with trimethylsulfoxonium iodide to give 17$\beta$,20-epoxy-3$\beta$-hydroxy-21-nor-17-iso-B-norpregn-5-ene.

This latter compound is refluxed with sodium methoxide to give 17$\alpha$-methoxymethyl-3$\beta$,17$\beta$-dihydroxy-B-norandrost-5-ene. Oppenauer oxidation of the 3-hydroxy group yields 17$\alpha$-methoxymethyl-B-nortestosterone. The 2-hydroxymethylene compound is then prepared by procedures described in Ser. No. 369,320.

It will be apparent to one skilled in the art of organic chemistry that certain obvious variants can be introduced into the compounds of the invention, without departing from the basic concept and spirit thereof. These variations are considered obvious and are within the province of one skilled in the art of organic chemistry.

Among these variations is salt formation. The weakly basic pyrazole compounds of the invention form acid addition salts with strong acids, exemplary of which are the hydrochloride, sulfate, hydrobromide, citrate, pamoate, maleate, cyclohexylsulfamate, nitrate, acetate, tartrate, and succinate.

A further variation is ester formation at the 17-position by means of acids such as formic, acetic, propionic, butyric, isobutyric, caproic, succinic, cyclopentylpropionic, benzoic, and phenylacetic. Such esters are formed by methods known to the art, including treatment with the appropriate acid chloride or anhydride, in the presence of a base such as pyridine.

It is also obvious to reduce the 4–5 double bond of the steroid nucleus by treatment with a liquid ammonia solution of an alkali or alkaline earth metal and a lower alkanol (U.S. 3,030,358).

Also obvious is the substitution of homologous groups for the R$^1$ group at the 17$\alpha$-position. For example, instead of a methyl or ethyl group, there can be a propyl, butyl, or pentyl group. Instead of an ethynyl group, there can be a propynyl or butynyl group. Instead of a methoxymethyl group, there can be an ethoxymethyl group.

A further variation is the reaction of substituted hydrazines instead of hydrazine in the reaction with the 2-hydroxymethylene steroid. The products of such a reaction are steroidal pyrazoles in which one of the nitrogen atoms of the pyrazole ring is substituted. Suitable hydrazine substituents include lower alkyl radicals such as methyl, ethyl, and propyl, and aryl radicals such as phenyl. Furthermore, the B-norsteroidal pyrazole products having an unsubstituted NH group may be acylated with reagents such as acetic or propionic anhydride in pyridine according to conventional techniques.

All these variants are considered obvious and are thus equivalent to the basic compounds specifically claimed.

The steroidal pyrazole compounds of the invention are believed to possess the structures as shown in this specification. However, certain of them may exist in a tautomeric form, in which the double bonds of the pyrazole ring possess an alternative arrangement. Use of the particular structures and nomenclature in the present specification and claims is intended to represent either isomer or mixtures thereof.

The following examples illustrate the preparation of the compounds of the invention, but are not to be construed as limitative of the scope thereof.

EXAMPLE 1

*17β-hydroxy-17α-methyl-B-norandrost-4-eno[3,2-c]pyrazole*

A solution of 5.0 g. of 2-hydroxymethylene-17α-methyl-B-nortestosterone in 100 ml. of ethanol containing 1.5 ml. of 85% hydrazine hydrate is refluxed under a nitrogen atmosphere for three hours. After cooling to room temperature, and allowing the solution to stand for 20 hours, the crystals which form are collected by filtration to give the title product, M.P. 239–241°, $[\alpha]_D^{25}$ —44.7°, U.V. λmax. 260 mμ (ε8,700).

EXAMPLE 2

*17α-methoxymethyl-B-nortestosterone*

To a solution of 8.2 g. of trimethylsulfoxonium iodide, previously prepared from dimethyl sulfoxide and methyl iodide, in 75 ml. of dimethyl sulfoxide is added 1.65 g. of 54% sodium hydride as a mineral oil suspension. The addition and subsequent reaction are carried out at room temperature under nitrogen with stirring. Ten minutes after the addition of sodium hydride is completed, 4.06 g. of β-nordehydroepiandrosterone [J. Joska, Coll. Czech. Chem. Comm., 25, 1086 (1960)] is added in portions, and after stirring for five hours, the resulting solution is allowed to stand at room temperature for 24 hours. The reaction mixture is diluted with benzene and poured into water, the benzene layer separated, and the aqueous phase extracted with additional portions of benzene. The combined and dried benzene extracts are evaporated to a residue which is crystallized from acetone-hexane to give 17β,20-epoxy-3β-hydroxy-21-nor-17 - iso - B - norpregn-5-ene, M.P. 158–160° C.

A solution of 8 g. of 17β,20-epoxy-3β-hydroxy-21-nor-17-iso-B-norpregn-5-ene in 200 ml. of methanol containing 8 g. of sodium methoxide is refluxed under nitrogen for eight hours and is then maintained at room temperature for 16 hours. The reaction mixture is concentrated to 75 ml., diluted with 750 ml. of cold water, and filtered to give 17α-methoxymethyl-3β,17β-dihydroxy-B-norandrost-5-ene which melts at 118–120° C. after recrystallization from acetone.

A solution of 3 g. of 17α-methoxymethyl-3β,17β-dihydroxy-B-norandrost-5-ene in 350 ml. of toluene containing 50 ml. of distilled cyclohexanone and 4 g. of aluminum isopropoxide is slowly distilled during three hours so that the reaction mixture is reduced to about half its original volume. The cooled reaction mixture is poured into 500 ml. of cold 5% aqueous hydrochloric acid, the organic layer is separated and the aqueous layer is extracted with benzene. The combined organic fractions are steam distilled until the distillate is clear and the cooled nonvolatile aqueous mixture is extracted with benzene-ether. Evaporation of the organic extracts gives the crude product which is purified by chromatography on activity III Woelm alumina. Elution with benzene yields 17α-methoxy-methyl-B-nortestosterone which melts at 107° C. after recrystallization from acetone-hexane.

EXAMPLE 3

The following 2-hydroxymethylene-B-norsteroids are treated with 85% hydrazine hydrate according to the procedure of Example 1.

2-hydroxymethylene-B-nortestosterone
2-hydroxymethylene-17α-methyl-19-nor-B-nortestosterone
2-hydroxymethylene-19-nor-B-nortestosterone
17α-ethynyl-2-hydroxymethylene-B-nortestosterone
2-hydroxymethylene-17α-methoxymethyl-B-nortestosterone The products are, respectively, 17β-hydroxy-B-norandrost-4-eno[3,2-c]pyrazole
17β-hydroxy-17α-methyl-B-norestr-4-eno[3,2-c]pyrazole
17β-hydroxy-B-norestr-4-eno[3,2-c]pyrazole
17α-ethynyl-17β-hydroxy-B-norandrost-4-eno[3,2-c]pyrazole
17β-hydroxy-17α-methoxymethyl-B-norandrost-4-eno[3,2-c]pyrazole

We claim:
1. A compound of the formula:

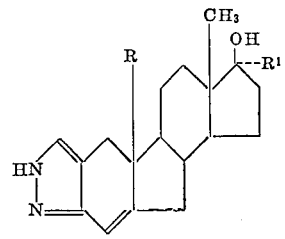

wherein:
R is selected from the group consisting of hydrogen and methyl; and
R¹ is selected from the group consisting of hydrogen, methyl, ethyl, ethynyl, and methoxymethyl.

2. A compound of the formula:

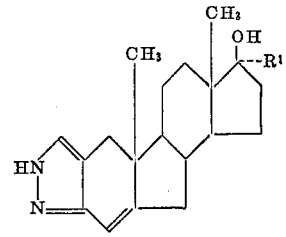

wherein R¹ is selected from the group consisting of hydrogen, methyl, ethyl, ethynyl, and methoxymethyl.

3. 17β-hydroxy-17α-methyl-B-norandrost-4-eno-[3,2-c]pyrazole.
4. 17β-hydroxy-B-norandrost-4-eno[3,2-c]pyrazole.
5. 17β-hydroxy-17α-methyl-B-norestr-4-eno[3,2-c]pyrazole.
6. 17β-hydroxy-B-norestr-4-eno[3,2-c]pyrazole.
7. 17α-ethynyl-17β-hydroxy-B-norandrost-4-eno-[3,2-c]pyrazole.
8. 17β-hydroxy-17α-methoxymethyl-B-norandrost-4-eno[3,2-c]pyrazole.

References Cited

UNITED STATES PATENTS

| | | | |
|---|---|---|---|
| 3,030,358 | 4/1962 | Manson | 260—239.5 |
| 3,072,681 | 1/1963 | Kerwin | 260—343.2 |
| 3,159,618 | 12/1964 | De Ruggieri et al. | 260—239.5 |

FOREIGN PATENTS 911,814  11/1962  Great Britain.

OTHER REFERENCES

Clinton et al.: Jour. Amer. Chem. Soc., vol. 81, pp. 1513–4 (1959).
Clinton et al.: Chem. Ind., 1961, pp. 2099–2100.
Joska et al.: Chem. Ind., 1958, pp. 1665–6.
Joska et al.: Coll. Czech. Chem. Comm., vol. 25, pp. 1086–90 (1960).
Ourisson et al.: Chem. Abst., vol. 54, Col. 7786 (1960).

JOHN D. RANDOLPH, *Primary Examiner.*

WALTER A. MODANCE, *Examiner.*

N. TROUSOF, *Assistant Examiner.*